United States Patent
Yang et al.

(10) Patent No.: US 8,710,695 B2
(45) Date of Patent: Apr. 29, 2014

(54) SYSTEM AND METHOD FOR PASSING PLC SIGNALS FROM A FIRST ELECTRICAL LINE TO A SECOND ELECTRICAL LINE

(75) Inventors: Jiun-Sheuan Yang, Fremont, CA (US); Xia MingYao, Guangdong (CN)

(73) Assignee: Asoka USA Corporation, Santa Clara, CA (US)

( * ) Notice: Subject to any disclaimer, the term of this patent is extended or adjusted under 35 U.S.C. 154(b) by 964 days.

(21) Appl. No.: 12/832,858

(22) Filed: Jul. 8, 2010

(65) Prior Publication Data

US 2012/0007422 A1 Jan. 12, 2012

(51) Int. Cl.
  *H02J 1/00* (2006.01)
(52) U.S. Cl.
  USPC .................................. 307/1; 307/3
(58) Field of Classification Search
  USPC .......................... 307/1, 3; 429/215
  See application file for complete search history.

(56) References Cited

U.S. PATENT DOCUMENTS

| | | |
|---|---|---|
| 7,413,471 B2 | 8/2008 | Chan |
| 7,415,541 B2 | 8/2008 | Chan et al. |
| 7,426,581 B2 | 9/2008 | Chan et al. |
| 7,457,885 B2 | 11/2008 | Chan et al. |
| 7,461,174 B2 | 12/2008 | Chan et al. |
| 2004/0156513 A1* | 8/2004 | Kaylor et al. ............... 381/77 |
| 2007/0091925 A1* | 4/2007 | Miyazaki et al. ........... 370/469 |
| 2007/0136766 A1* | 6/2007 | Iwamura .................... 725/79 |
| 2007/0138867 A1* | 6/2007 | Choi et al. .................. 307/3 |
| 2007/0190840 A1* | 8/2007 | Hanada et al. .............. 439/215 |

* cited by examiner

*Primary Examiner* — Jared Fureman
*Assistant Examiner* — Alfonso Perez Borroto
(74) *Attorney, Agent, or Firm* — Baker Botts L.L.P.

(57) ABSTRACT

In accordance with one embodiment of the present disclosure, a method may include receiving, at a first plug link device prong, a Powerline Communication (PLC) signal from a first main electrical line. The method may further include transferring the PLC signal from the first plug link device prong to a first plug link device electrical line. The method may also include passing the PLC signal from the first plug link device electrical line to a second plug link device electrical line. The method may also include transferring the PLC signal from the second plug link device electrical line to a second plug link device prong. The method may also include sending, from the second plug link device prong, the PLC signal to a second main electrical line.

27 Claims, 5 Drawing Sheets

US 8,710,695 B2

SYSTEM AND METHOD FOR PASSING PLC SIGNALS FROM A FIRST ELECTRICAL LINE TO A SECOND ELECTRICAL LINE

TECHNICAL FIELD

The present disclosure relates generally to powerline communications and more particularly to a system and method for passing PLC signals from a first electrical line to a second electrical line.

BACKGROUND

Typically, a powerline communication (PLC) system allows a PLC signal to be passed over an electrical line. As such, the PLC system may allow a first device to communicate with a second device over the electrical line. Such PLC systems, however, are deficient.

SUMMARY

In accordance with one embodiment of the present disclosure, a method may include receiving, at a first plug link device prong, a Powerline Communication (PLC) signal from a first main electrical line. The method may further include transferring the PLC signal from the first plug link device prong to a first plug link device electrical line. The method may also include passing the PLC signal from the first plug link device electrical line to a second plug link device electrical line. The method may also include transferring the PLC signal from the second plug link device electrical line to a second plug link device prong. The method may also include sending, from the second plug link device prong, the PLC signal to a second main electrical line.

Numerous technical advantages are provided according to various embodiments of the present disclosure. Particular embodiments of the disclosure may exhibit none, some, or all of the following advantages depending on the implementation. In certain embodiments, a PLC signal may be passed from a first electrical line to a second electrical line by a coupling device. As such, a device coupled to the first electrical line may be able to communicate with a device coupled to the second electrical line even though they are coupled to separate electrical lines.

In another embodiment, a plug link device may be coupled to a 240 volt electrical socket. As such, the plug link device may pass a PLC signal from a first electrical line to a second electrical line by being coupled to a standard electrical outlet that may be available in, for example, a house, an apartment, a building, or any other suitable location.

In another embodiment, a plug link device may include a first electrical socket hole and second electrical socket hole that are coupled to a first plug link device electrical line and a second plug link device electrical line. As such, the plug link device may provide an electrical current to another device coupled to the plug link device while the plug link device also passes a PLC signal from a first electrical line to a second electrical line.

In another embodiment, a plug link device may include a PLC interface that transforms a PLC signal from a first format to a second format. As such, the transformation of the PLC signal may allow the PLC signal to be communicated over longer distances without losing its strength of signal.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Embodiments of the present invention and its advantages are best understood by referring to FIGS. 1 through 10 of the drawings, like numerals being used for like and corresponding parts of the various drawings.

Figure 1:
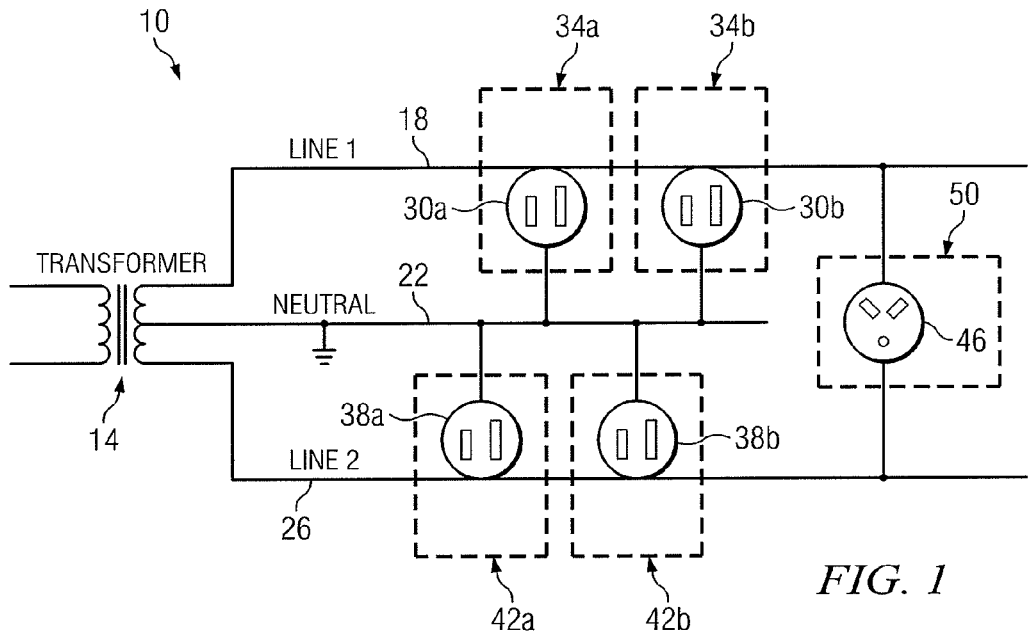
FIG. 1 is a diagram illustrating one embodiment of a communication system for passing PLC signals from a main electrical line to a second main electrical line.

FIG. 1 is a diagram illustrating one embodiment of a communication system 10 for passing Powerline communication (PLC) signals from a main electrical line to a second main electrical line. In one embodiment, the communication system 10 may include a plug link device 50 that passes PLC signals from a first main electrical line 18 to a second main electrical line 26. As such, a PLC signal sent from a first device 34a may be received by a second device 42a, allowing the first device 34a to communicate with the second device 42*a* even though the first device 34*a* is coupled to a different main electrical line than the second device 42*a*.

According to the illustrated embodiment, a PLC signal may include any type of communication signal that may travel over powerlines. In one embodiment, a PLC signal may travel over electrical lines that provide an electrical current. For example, a PLC signal may be transmitted from a device that is coupled to an electrical line. In such an example, the device may provide the PLC signal to the electrical line in order for the PLC signal to be passed to another device coupled to the electrical line. Accordingly, the devices may communicate using the electrical line. In one embodiment, by communicating using PLC signals, the electrical lines may operate as a local area network environment. In one embodiment, this local area network may include one or more electrical lines in a house, apartment, or any other suitable location.

According to the illustrated embodiment, the communication system 10 includes a transformer 14, the first main electrical line 18, a ground wire 22, the second main electrical line 26, first electrical outlets 30*a* and 30*b*, first devices 34*a* and 34*b*, second electrical outlets 38*a* and 38*b*, second devices 42*a* and 42*b*, a combining outlet 46, and the plug link device 50.

The transformer 14 may include any device that provides electrical current to both the first main electrical line 18 and the second main electrical line 26. In one embodiment, the transformer 14 may provide a 120 volt electrical current to the first main electrical line 18 and may also provide a 120 volt electrical current to the second main electrical line 26. In another embodiment, the transformer 14 may provide an electrical current with any suitable voltage to the first main electrical line 18 and the second main electrical line 26. For example, the transformer may provide a 110 volt electrical current, a 220 volt electrical current, or a 230 volt electrical current. In another embodiment, the transformer 14 may further receive an electrical current from a distribution grid, and further convert the electrical current to an amount provided to the first main electrical line 18 and the second main electrical line 26. For example, the transformer 14 may receive a 7,200 volt electrical current and convert that 7,200 volt electrical current into a 120 volt electrical current that is provided to both the first main electrical line 18 and the second main electrical line 26.

The first main electrical line 18 may include any line that receives an electrical current and provides that electrical current to a location. For example, the first main electrical line 18 may include an electrical wire that provides an electrical current to a house, an apartment, a building, or any other suitable location. In one embodiment, the first main electrical line 18 may provide the electrical current to an apparatus coupled to the first main electrical line 18. For example, the first main electrical line 18 may provide the electrical current to the first electrical outlets 30*a* and 30*b*, in order to further provide the electrical current to one or more devices. Accordingly, in one embodiment, the first main electrical line 18 may provide the electrical current received from the transformer 14 to the first devices 34*a* and 34*b* so that the first devices 34*a* and 34*b* may be operated. In another embodiment, the first main electrical line 18 may further receive PLC signals and provide the PLC signals to a location. For example, the first main electrical line 18 may receive a PLC signal sent from the first device 34*a*, and provide that PLC signal to the first device 34*b*. In such an embodiment, the first main electrical line 18 may allow the first device 34*a* to communicate with the first device 34*b*.

The ground wire 22 may include any wire that provides a grounded connection to the communication system 10. For example, the ground wire 22 may provide a grounded connection to each of the first electrical outlets 30*a* and 30*b*, each of the second electrical outlets 38*a* and 38*b*, and also to the combining outlet 46. As such, the electrical current provided by the transformer 14 may be grounded by the ground wire 22.

The second main electrical line 26 may include any line that receives an electrical current and provides that electrical current to a location. In one embodiment, the second main electrical line 26 may be similar to the first main electrical line 18. For example, the second main electrical line 26 may receive an electrical current from the transformer 14 and provide the electrical current to the second electrical outlets 38*a* and 38*b* in order to further provide the electrical current to the second devices 42*a* and 42*b*. As another example, the second main electrical line 26 may further receive PLC signals and provide the signals to a location. Accordingly, the second main electrical line 26 may receive a PLC signal sent from the second device 42*a* and provide that PLC signal to the second device 42*b*. In such an embodiment, the second main electrical line 26 may allow the second device 42*a* to communicate with the second device 42*b*.

The first electrical outlets 30*a* and 30*b* and the second electrical outlets 38*a* and 38*b* each include any device that receives electrical current and provides that electrical current to a device. For example, the electrical outlets 30*a* and 30*b* and the second electrical outlets 38*a* and 38*b* may provide electrical current to the first devices 34*a* and 34*b* and the second devices 42*a* and 42*b* when they are coupled to the first electrical outlets 30*a* and 30*b* and the second electrical outlets 38*a* and 38*b*.

The first devices 34*a* and 34*b* and the second devices 42*a* and 42*b* may each include any device that may communicate with another device through the first main electrical line 18 and the second main electrical line 26. For example, the first devices 34*a* and 34*b* and the second devices 42*a* and 42*b* may each include a computer, a phone, a personal digital assistant, a digital camera, a printer, or any other suitable device for communicating. In one embodiment, the first devices 34*a* and 34*b* and the second devices 42*a* and 42*b* may communicate with each other by passing PLC signals to each other over the first main electrical line 18 and the second main electrical line 26.

In another embodiment, each of the first devices 34*a* and 34*b* and the second devices 42*a* and 42*b* may further include any device that may transform a signal received in a first format to a signal in a second format. For example, according to one embodiment, the first devices 34*a* and 34*b* and the second devices 42*a* and 42*b* may each include a device that receives a PLC signal in an Orthogonal Frequency Division Multiplexing (OFDM) format, and converts it into an Open System Interconnection (OSI) reference model layer 2 frame format. In a further embodiment, the first devices 34*a* and 34*b* and the second devices 42*a* and 42*b* may further transform the PLC signal from the second format, such as layer 2 frame format, to a first format, such as OFDM, in order to communicate the PLC signal to another device using the first main electrical line 18 and/or the second main electrical line 26.

According to one embodiment, the first devices 34*a* and 34*b* may receive an electrical current from the first main electrical line 18, and the second devices 42*a* and 42*b* may receive an electrical current from the second main electrical line 26. In one embodiment, the electrical current may allow the first devices 34*a* and 34*b* and the second devices 42*a* and 42*b* to operate. In such an embodiment, the first devices 34*a* and 34b and the second devices 42a and 42b may receive their electrical current needs from the first main electrical line 18 and/or the second main electrical line 26, and may also receive and send PLC signals using the first main electrical line 18 and/or the second main electrical line 26.

Although the illustrated embodiment of communication system 10 illustrates only two first devices 34a and 34b and two second devices 42a and 42b, the communication system 10 may include any suitable number of devices. For example, the communication system 10 may include more than two first devices 34, less than two first devices 34, or any other number of first devices 34. As such, in one embodiment, a single first device 34a coupled to the first main electrical line 18 may send and receive PLC signals to and from any number of second devices 42 coupled to the second main electrical line 26.

The combining outlet 46 may include any apparatus that is coupled to both the first main electrical line 18 and the second main electrical line 26. In one embodiment, by coupling to both the first main electrical line 18 and the second main electrical line 26, the combining outlet 46 may receive an electrical current from both the first main electrical line 18 and the second main electrical line 26. In such an embodiment, the combining outlet 46 may receive an electrical current with twice the voltage of either of the electrical currents provided by the first main electrical line 18 and the second main electrical line 26. For example, in an embodiment where the first main electrical line 18 provides a 120 volt electrical current and the second main electrical line 26 also provides a 120 volt electrical current, the combining outlet may receive 240 volts of electrical current. In another embodiment, the combining outlet 46 may further provide the electrical current to another device (not shown). For example, in an embodiment where the combining outlet 46 receives a 240 volts electrical current, the combining outlet 46 may provide the 240 volt electrical current to any device coupled to the combining outlet 46. For example, the combining outlet 46 may provide the 240 volt electrical current to a dryer unit, an oven, or any other suitable device that requires a 240 volt electrical current.

The plug link device 50 may include any device that passes PLC signals from the first main electrical line 18 to the second main electrical line 26. For example, the plug link device 50 may include a coupling device that couples the first main electrical line 18 to the second main electrical line 26 in order to pass the PLC signals. According to one embodiment, the plug link device 50 may receive a PLC signal sent from the first device 34a on the first main electrical line 18, and may pass the PLC signal to the second main electrical line 26 for delivery to the second device 42a. As such, the plug link device 50 may allow the first device 34a to communicate with the second device 42a even though the first device 34a is coupled to the first main electrical line 18 and the second device 42a is coupled to the second main electrical line 26.

In another embodiment, the plug link device 50 may further receive an electrical current from the first main electrical line 18 and the second main electrical line 26. In such an embodiment, the plug link device 50 may provide the electrical current received from the first main electrical line 18 and the second main electrical line 26 to another device. For example, the plug link device 50 may provide a 240 volt electrical current to a dryer, an oven, or any other suitable device. In another embodiment, the plug link device 50 may prevent any electrical current received from a main electrical line, such as the first main electrical line 18, from being passed to the other main electrical line, such as the second main electrical line 26. According to one embodiment, the plug link device may be coupled to the combining outlet 46 in order to pass PLC signals from the first main electrical line 18 to the second main electrical line 26. As such, in one embodiment, the plug link device 50 may be coupled to a 240 volt electrical outlet in order to pass PLC signals from the first main electrical line 18 to the second main electrical line 26. Accordingly, the plug link device 50 may pass the PLC signals from the first main electrical line 18 to the second main electrical line 26 by being coupled to a standard electrical outlet that may be available in, for example, a house, an apartment, a building, or any other suitable location. The plug link device 50 is discussed in further detail in FIGS. 2 through 10.

Although the illustrated embodiment of the communication system 10 illustrates PLC signals being passed from the first main electrical line 18 to the second main electrical line 26, the PLC signals may travel in any suitable direction. For example, the PLC signals may be passed from the second main electrical line 26 to the first main electrical line 18.

Modifications, additions, or omissions may be made to the communication system 10 without departing from the scope of the invention. The components of the communication system 10 may be integrated or separated. Moreover, the operations of the communication system 10 may be performed by more, fewer, or other components. For example, the operations of the plug link device 50 may be performed by more than one component. As used in this document, "each" refers to each member of a set or each member of a subset of a set.

Figure 2:
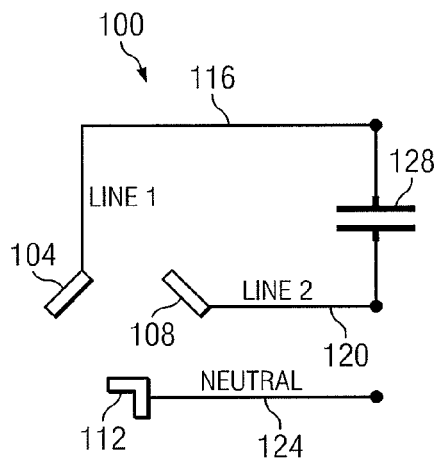
FIG. 2 is a diagram illustrating one embodiment of a plug link device for passing PLC signals from a first plug link electrical line to a second plug link electrical line.

FIG. 2 is a diagram illustrating one embodiment of a plug link device 100 for passing PLC signals from a first plug link device electrical line to a second plug link device electrical line. In one embodiment, the plug link device 100 may include a coupling device 128 that may allow PLC signals to pass from a first plug link device electrical line 116 to a second plug link device electrical line 120. As such, the plug link device 100 may allow any PLC signals received from a first main electrical line, as described in FIG. 1, to pass from the first plug link device electrical line 116 to the second plug link device electrical line 120. Accordingly, the plug link device 100 may further pass the PLC signal from the second plug link device electrical line 120 to the second main electrical line, as is also discussed in FIG. 1, for communication to a device.

According to the illustrated embodiment, the plug link device 100 may include a first plug link device prong 104, a second plug link device prong 108, a third plug link device prong 112, the first plug link device electrical line 116, the second plug link device electrical line 120, a ground wire 124, and the coupling device 128.

The first plug link device prong 104 and the second plug link device prong 108 may each include any element that may be inserted into an electrical outlet, such as the combining outlet 46 described in FIG. 1, in order to allow an electrical current and PLC signals to pass from the electrical outlet into the plug link device 100. For example, the first plug link device prong 104 and the second plug link device prong 108 may include metal prongs. In one embodiment, the first plug link device prong 104 may be coupled to the first plug link device electrical line 116, and the second plug link device prong 108 may be coupled to the second plug link device electrical line 120. In such an embodiment, the first plug link device prong 104 and the second plug link device prong 108 may pass electrical current and PLC signals to the first plug link device electrical line 116 and the second plug link device electrical line 120.

The third plug link device prong 112 may include any element that may be inserted into an electrical outlet, such as the combining outlet 46 described in FIG. 1, in order to provide a connection to a ground wire. In one embodiment, the third plug link device prong 112 may be similar to the first plug link device prong 104 and the second plug link device prong 108. In the illustrated embodiment, the third plug link device prong 112 may be coupled to ground wire 124. In such an embodiment, the third plug link device prong 112 and the ground wire 124 may provide a connection to a main ground wire, such as the ground wire 22 described in FIG. 1, allowing the plug link device 100 to be grounded.

Although the illustrated embodiment of the plug link device 100 illustrates the first plug link device prong 104, the second plug link device prong 108, and the third plug link device prong 112, the plug link device 100 may include any suitable number of prongs. For example, the plug link device 100 may include two prongs, or more than three prongs. In a further embodiment, the first plug link device prong 104, the second plug link device prong 108, and the third plug link device prong 112 may be inserted into an electrical outlet that provides any suitable electrical current. For example, the first plug link device prong 104, the second plug link device prong 108, and the third plug link device prong 112 may be inserted into an electrical outlet that provides a 240 volt electrical current.

The first plug link device electrical line 116 and the second plug link device electrical line 120 may each include any line that receives an electrical current and provides that electrical current to a location. For example, the first plug link device electrical line 116 and the second plug link device electrical line 120 may each include an electrical wire that provides an electrical current to the coupling device 128. In one embodiment, the first plug link device electrical line 116 may be coupled to the first plug link device prong 104, and the second plug link device electrical line 120 may be coupled to the second plug link device prong 108. In such an embodiment, the first plug link device electrical line 116 and the second plug link device electrical line 120 may provide the electrical current received from the first plug link device prong 104 and the second plug link device prong 108 (which was received from the first main electrical line and the second main electrical line, as is discussed in FIG. 1) to the coupling device 128.

In another embodiment, the first plug link device electrical line 116 and the second plug link device electrical line 120 may each further receive PLC signals and provide the signals to a location. For example, the first plug link device electrical line 116 and the second plug link device electrical line 120 may each receive a PLC signal and pass the signal to the coupling device 128. In such an embodiment, the first plug link device electrical line 116 and the second plug link device electrical line 120 may allow PLC signals to be passed to each other.

The ground wire 124 may include any wire that provides a grounded connection to the plug link device 100. In one embodiment, the ground wire 124 may be coupled to the third plug link device prong 112 in order to provide a connection to a main ground wire, such as the ground wire 22 described in FIG. 1. As such, the electrical current provided to the plug link device 100 may be grounded by the ground wire 124.

The coupling device 128 may include any device that couples the first plug link device electrical line 116 to the second plug link device electrical line 120, and further allows a PLC signal to pass from the first plug link device electrical line 116 to the second plug link device electrical line 120. For example, the coupling device 128 may include a capacitor. In one embodiment, the coupling device 128 may allow the PLC signals to pass from the first plug link device electrical line 116 to the second plug link device electrical line 120, but may also prevent any electrical current from passing from the first plug link device electrical line 116 to the second plug link device electrical line 120. For example, the coupling device 128 may filter out an electrical current received from the first plug link device electrical line 116 so that none of the electrical current is passed to the second plug link device electrical line 120. As such, the coupling device 128 may prevent any short circuit of the first plug link device electrical line 116 and/or the second plug link device electrical line 120.

In an embodiment where the coupling device 128 includes a capacitor, the capacitor may have a capacitance in the range of 0.0022 through 2.2 microfarads. In a further embodiment, the coupling device 128 may have a capacitance of 0.0022 microfarads and above. In another embodiment the coupling device 128 may have a capacitance of 2.2 microfarads and below. In other embodiments, the coupling device 128 may have any other suitable capacitance that may allow PLC signals to pass from the first plug link device electrical line 116 to the second plug link device electrical line 120, but prevent any electrical current from passing from the first plug link device electrical line 116 to the second plug link device electrical line 120.

Although the illustrated embodiment of the plug link device 100 illustrates PLC signals being passed from the first plug link device electrical line 116 to the second plug link device electrical line 120, the PLC signals may travel in any suitable direction. For example, the PLC signals may be passed from the second plug link device electrical line 120 to the first plug link device electrical line 116.

Modifications, additions, or omissions may be made to the plug link device 100 without departing from the scope of the invention. The components of the plug link device 100 may be integrated or separated. Moreover, the operations of the plug link device 100 may be performed by more, fewer, or other components. For example, the operations of the coupling device 128 may be performed by more than one component.

Figure 7:
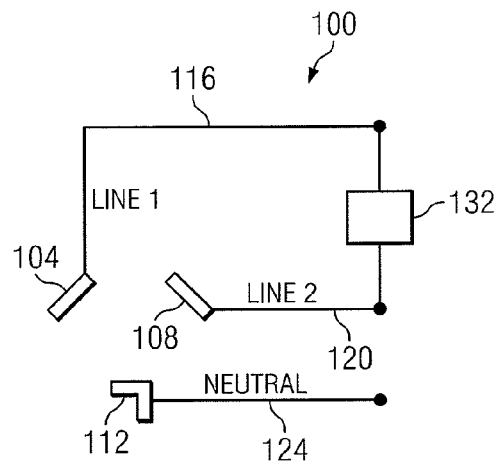
FIG. 7 is a diagram illustrating one embodiment of a plug link device for passing PLC signals from a first plug link electrical line to a second plug link electrical line.

In a further embodiment, the operations of the coupling device 128 of FIG. 2 may be performed by any other suitable device. As one example, FIG. 7 illustrates an alternative embodiment of the plug link device 100 that includes a signal coupling device 132 that may allow PLC signals to pass from the first plug link device electrical line 116 to the second plug link device electrical line 120. In one embodiment, the signal coupling device 132 may include a band-pass filter. As such, the signal coupling device 132 may include one or more resistors, one or more capacitors, and one or more inductors. In one embodiment, the signal coupling device 132 may allow the PLC signals to pass from the first plug link device electrical line 116 to the second plug link device electrical line 120, but may also prevent any electrical current from passing from the first plug link device electrical line 116 to the second plug link device electrical line 120. For example, the signal coupling device 132 may filter out an electrical current received from the first plug link device electrical line 116 so that none of the electrical current is passed to the second plug link device electrical line 120. As such, the coupling device 132 may prevent any short circuit of the first plug link device electrical line 116 and/or the second plug link device electrical line 120.

Figure 3:
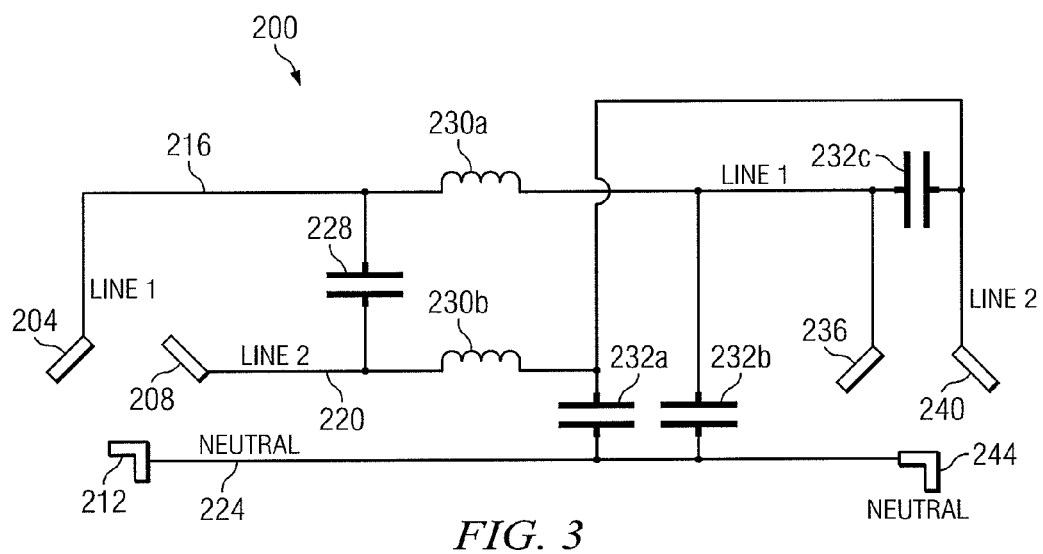
FIG. 3 is a diagram illustrating one embodiment of a plug link device for passing PLC signals from a first plug link device electrical line to a second plug link device electrical line, and further for providing electrical current to another device coupled to the plug link device.

FIG. 3 is a diagram illustrating one embodiment of a plug link device 200 for passing PLC signals from a first plug link device electrical line to a second plug link device electrical line, and further for providing electrical current to another device coupled to the plug link device 200. In one embodiment, the plug link device 200 may include a first electrical socket hole 236 and a second electrical socket hole 240 that may provide an electrical current to a device that is coupled to the plug link device 200 through the first electrical socket hole 236 and the second electrical socket hole 240. As such, a device, such as a dryer unit or an oven, may be coupled to the plug link device 200 in order to receive an electrical current. Accordingly, the plug link device 200 may provide an electrical current to another device while the plug link device 200 also passes PLC signals from the first plug link device electrical line 216 to the second plug link device electrical line 220.

According to the illustrated embodiment, the plug link device 200 may include a first plug link device prong 204, a second plug link device prong 208, a third plug link device prong 212, the first plug link device electrical line 216, the second plug link device electrical line 220, a ground wire 224, a coupling device 228, and standard capacitors 232a, 232b, and 232c. In one embodiment, the first plug link device prong 204 of FIG. 3 may be similar to the first plug link device prong 104 of FIG. 2; the second plug link device prong 208 of FIG. 3 may be similar to the second plug link device prong 108 of FIG. 2; the third plug link device prong 212 of FIG. 3 may be similar to the third plug link device prong 112 of FIG. 2; the first plug link device electrical line 216 of FIG. 3 may be similar to the first plug link device electrical line 116 of FIG. 2; the second plug link device electrical line 220 of FIG. 3 may be similar to the second plug link device electrical line 120 of FIG. 2; and the ground wire 224 of FIG. 3 may be similar to the ground wire 124 of FIG. 2.

According to the illustrated embodiment, the plug link device 200 may further include filters 230a, 230b, 232a, 232b, and 232c, the first electrical socket hole 236, the second electrical socket hole 240, and the third electrical socket 244. The filters 230a and 230b may each include any device that may filter any electrical noise caused by another device (not shown) coupled to the plug link device 200 through the first electrical socket 236, the second electrical socket 240, and the third electrical socket 244. In one embodiment, the filters 230a and 230b may each include an inductor. In such an embodiment, the filters 230a and 230b may each have an inductance in the range of 1.0 micro-henry through 1.0 milli-henry. In another embodiment, the filters 230a and 230b may each have an inductance of 1.0 micro-henry and above. In a further embodiment, the filters 230a and 230b may each have an inductance of 1.0 milli-henry and below. In further embodiments, the filters 230a and 230b may have any other suitable inductance for filtering out any electrical noise from a device coupled to the plug link device 200 through the first electrical socket hole 236, the second electrical socket hole 240, and the third electrical socket hole 244. According to one embodiment, the filters 230a and 230b may each be disposed in the plug link device 200 in a location in-between the coupling device 228 and the first electrical socket hole 236 or the second electrical socket hole 240. As such, the filters 230a and 230b may each be disposed in a location in the plug link device 200 that allows them to filter out any electrical noise caused by the device before the electrical noise may interfere with the PLC signals.

In another embodiment, the filters 230a and 230b may receive an electrical current from the first plug device electrical line 216 and the second plug link device electrical line 220, and may further pass the electrical current to the first electrical socket hole 236 and the second electrical socket hole 240. In such an embodiment, the filters 230a and 230b may allow an electrical current to be provided to another device, such as a dryer unit or an oven, that is coupled to the plug link device 200, while preventing any electrical noise from the device interfering with the passing of the PLC signals from the first plug link device electrical line 216 to the second plug link device electrical line 220.

The first electrical socket hole 236 and the second electrical socket hole 240 may each include any device for providing an electrical current to another device (not shown), such as a dryer unit or an oven, coupled to the plug link device 200. In one embodiment, the first electrical socket hole 236 may be coupled to the first plug link device electrical line 216 and the second electrical socket hole 240 may be coupled to the second plug link device electrical line 220. As such, in one embodiment, the first electrical socket hole 236 may receive a first electrical current that passes through the first plug link device electrical line 216, and the second electrical socket hole 240 may receive a second electrical current that passes through the plug link device electrical line 220. In such an embodiment, each of the first electrical socket hole 236 and the second electrical socket hole 240 may provide an electrical current to a device coupled to the plug link device 200 through the first electrical socket hole 236 and the second electrical socket hole 240. Accordingly, in one embodiment, the device may receive a 240 volt electrical current, allowing any device that requires 240 volt electrical current to operate.

The third electrical socket hole 244 may include any device that provides a coupling to the ground wire 224. In one embodiment, the third electrical socket hole 244 may be coupled to the ground wire 224. As such, the electrical current provided to the device coupled to the plug link device 200 may be grounded by the ground wire 224.

Although the illustrated embodiment of the plug link device 200 illustrates a first electrical socket hole 236, a second electrical socket hole 240, and a third electrical socket hole 244, the plug link device 200 may include any suitable number of electrical socket holes. For example, the plug link device 200 may include two electrical socket holes or more than three electrical socket holes.

Although the illustrated embodiment of the plug link device 200 illustrates PLC signals being passed from the first plug link device electrical line 216 to the second plug link device electrical line 220, the PLC signals may travel in any suitable direction. For example, the PLC signals may be passed from the second plug link device electrical line 220 to the first plug link device electrical line 216.

Modifications, additions, or omissions may be made to the plug link device 200 without departing from the scope of the invention. The components of the plug link device 200 may be integrated or separated. Moreover, the operations of the plug link device 200 may be performed by more, fewer, or other components. For example, the operations of the coupling device 228 may be performed by more than one component.

Figure 8:
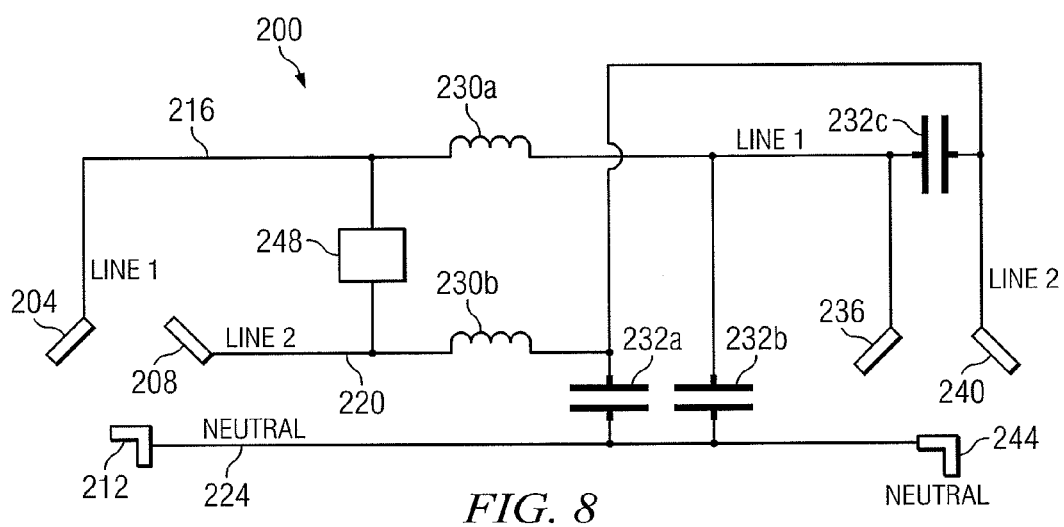
FIG. 8 is a diagram illustrating one embodiment of a plug link device for passing PLC signals from a first plug link device electrical line to a second plug link device electrical line, and further for providing electrical current to another device coupled to the plug link device.

In a further embodiment, the operations of the coupling device 228 of FIG. 3 may be performed by any other suitable device. As one example, FIG. 8 illustrates an alternative embodiment of the plug link device 200 that includes a signal coupling device 248 that may allow PLC signals to pass from the first plug link device electrical line 216 to the second plug link device electrical line 220. In one embodiment, the signal coupling device 248 may include a band-pass filter. As such, the signal coupling device 248 may include one or more resistors, one or more capacitors, and one or more inductors. In one embodiment, the signal coupling device 248 may allow the PLC signals to pass from the first plug link device electrical line 216 to the second plug link device electrical line 220, but may also prevent any electrical current from passing from the first plug link device electrical line 216 to the second plug link device electrical line 220. For example, the signal coupling device 248 may filter out an electrical current received from the first plug link device electrical line 216 so that none of the electrical current is passed to the second plug link device electrical line 220. As such, the signal coupling device 248 may prevent any short circuit of the first plug link device electrical line 216 and/or the second plug link device electrical line 220.

Figure 4:
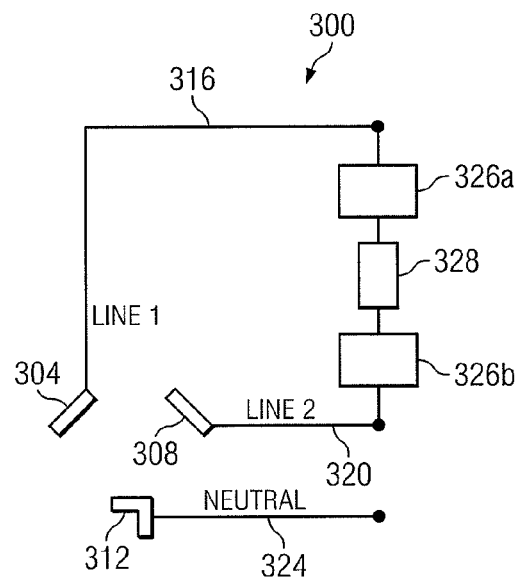
FIG. 4 is a diagram illustrating one embodiment of a plug link device for passing PLC signals from a first plug link device electrical line to a second plug link device electrical line.

FIG. 4 is a diagram illustrating one embodiment of a plug link device 300 for passing PLC signals from a first plug link device electrical line to a second plug link device electrical line. In one embodiment, the plug link device 300 may include PLC interfaces 326a and 326b that transform each received PLC signal from a first format into a second format before passing the PLC signal along. As such, each PLC signal received from the first plug link device electrical line 316 may be transformed from a first format to a second format by the PLC interface 326a, and then transformed again from the second format back to the first format by the PLC interface 326b before being passed to the second plug link device electrical line 320. Accordingly, such transformation of the PLC signal may allow the PLC signal to be communicated over longer distances without losing its strength of signal.

According to the illustrated embodiment, the plug link device 300 may include a first plug link device prong 304, a second plug link device prong 308, a third plug link device prong 312, the first plug link device electrical line 316, the second plug link device electrical line 320, and a ground wire 324. In one embodiment, the first plug link device prong 304 of FIG. 4 may be similar to the first plug link device prong 204 of FIG. 3; the second plug link device prong 308 of FIG. 4 may be similar to the second plug link device prong 208 of FIG. 3; the third plug link device prong 312 of FIG. 4 may be similar to the third plug link device prong 212 of FIG. 3; the first plug link device electrical line 316 of FIG. 4 may be similar to the first plug link device electrical line 216 of FIG. 3; the second plug link device electrical line 320 of FIG. 4 may be similar to the second plug link device electrical line 220 of FIG. 3; and the ground wire 324 of FIG. 4 may be similar to the ground wire 224 of FIG. 3.

According to the illustrated embodiment, the plug link device 300 further includes the PLC interfaces 326a and 326b, and a coupling device 328. The PLC interfaces 326a and 326b may each include any device that may receive a PLC signal in a first format and transform the PLC signal from the first format to a second format before passing the PLC signal along. For example, in one embodiment, the PLC interface 326a may receive a PLC signal from the first plug link device electrical line 316 in an OFDM format. In such an embodiment, the PLC interface 326a may transform the PLC signal in the OFDM format into a layer 2 frame format. Accordingly, the PLC interface 326a may pass the PLC signal along in the layer 2 frame format. As another example, the PLC interface 326b may receive a PLC signal in the layer 2 frame format and transform the PLC signal from the layer 2 frame format to an OFDM format. As such, the PLC interface may pass the PLC signal along in the OFDM format. In one embodiment, transforming the PLC signal may include first terminating the header of the PLC signal, and then transforming the contents contained in the PLC frames. According to one embodiment, by transforming the PLC signal from a first format to a second format, the PLC interfaces 326a and 326b may be able to re-strengthen the signal strength of the PLC signal. For example, the PLC interfaces 326a and 326b may receive a PLC signal that has travelled a long distance, and thus, may have a weaker signal than when originally transmitted. In such an example, the PLC interfaces 326a and 326b may be able to re-strengthen the signal by receiving the PLC signal and transforming it. This may, in one embodiment, allow each PLC signal to travel longer distances.

In one embodiment, the PLC interfaces 326a and 326b may each be disposed in a location in the plug link device 300 so that a PLC signal that is transformed by the PLC interface 326a may also be further transformed by the PLC interface 326b before the PLC signal is passed to the second plug link device electrical line 320. As such, in one embodiment, the PLC interface 326a may transform a PLC signal from an OFDM format to a layer 2 frame format, and the PLC interface 326b may transform the PLC signal from the layer 2 frame format back to the OFDM format. In such an embodiment, the PLC interface 326b may further re-generate a PLC header for the PLC signal before passing the PLC signal along. In a further embodiment, the PLC interfaces 326a and 326b may each further receive an electrical current and prevent that electrical current from being passed along. For example, the PLC interface 326a may receive an electrical current and prevent the electrical current from being passed to the plug link device electrical line 320. As such, in one embodiment, the PLC interfaces 326a and 326b may pass along PLC signals from the first plug link device electrical line 316 to the second plug link device electrical line 320, but prevent an electrical current received from the first plug link device electrical line 316 from being passed to the second plug link device electrical line 320. In such an embodiment, the PLC interfaces 326a and 326b may prevent the first plug link device electrical line 316 and the second plug link device electrical line 320 from short circuiting.

The coupling device 328 may include any device that may receive a PLC signal in a first format and pass the PLC signal along in the same format. For example, the coupling device 328 may include an Ethernet bridge. As another example, the coupling device 328 may include a layer 2 switch. As a further example, the coupling device 328 may include an Ethernet switch. In one embodiment, the coupling device 328 may receive the PLC signal from the PLC interface 326a in a layer 2 frame format. In such an embodiment, the coupling device may pass the PLC signal in the layer 2 frame format to the PLC interface 326b while the PLC signal remains in the layer 2 frame format. As such, the coupling device 328 may allow the PLC interface 326a to transform a PLC signal from a first format to a second format (which may include first terminating the PLC header of the PLC signal and then transforming the contents of the PLC frame from a first format to a second format), and then allow the PLC interface 326b to receive the PLC signal in the second format so that it may transform the PLC signal back to the first format (which may include transforming the contents of the PLC frame from the second format back to the first format, and then re-generating the PLC header of the PLC signal). For example, the plug link device 300 may receive a PLC signal in an OFDM format on the first plug link device electrical line 316 and may pass the PLC signal to the second plug link device electrical line 320 in the OFDM format. As such, in one embodiment, the second plug link device electrical line 320 may receive the PLC signal in the OFDM format, but with a signal strength that is strong. Accordingly, the PLC signal may travel a longer distance.

In a further embodiment, the coupling device 328 may include a device that may send testing signals to (or receive testing signals from) the PLC interfaces 326a and 326b, any components of the plug link device 300, and/or any components, such as those described in FIG. 1, that the plug link device 300 may be coupled to. The coupling device 328 may include a testing module that may allow for any suitable type of test. For example, the coupling device 328 may transmit testing signals throughout (or receive testing signals from) the plug link device 300, the main electrical lines coupled to the plug link device 300, or the first and second devices coupled to the main electrical lines (as illustrated in FIG. 1). As such, the coupling device 328 may test for any suitable problems that may occur during the communication of PLC signals, or may further test for (or retrieve) any suitable data during the communication of PLC signals. In one embodiment, the coupling device 328 allow the plug link device 300 to test content of the PLC signals, test payload of the PLC signals, test patterns, retrieve timestamps, or retrieve and transmit attributes of the PLC signals (such as attributes that identify the PLC signals, identify the device that sent the PLC signals, or identify the version of the device that sent the PLC signals).

Although the illustrated embodiment of the plug link device 300 illustrates PLC signals being passed from the first plug link device electrical line 316 to the second plug link device electrical line 320, the PLC signals may travel in any suitable direction. For example, the PLC signals may be passed from the second plug link device electrical line 320 to the first plug link device electrical line 316.

Modifications, additions, or omissions may be made to the plug link device 300 without departing from the scope of the invention. The components of the plug link device 300 may be integrated or separated. Moreover, the operations of the plug link device 300 may be performed by more, fewer, or other components. For example, the operations of the PLC interface 326a may be performed by more than one component.

Figure 9:
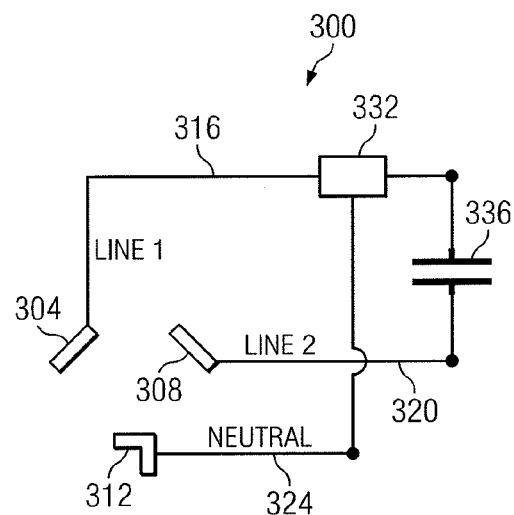
FIG. 9 is a diagram illustrating one embodiment of a plug link device for passing PLC signals from a first plug link device electrical line to a second plug link device electrical line.

In a further embodiment, the operations of the PLC interfaces 326 and the coupling device 328 of FIG. 4 may be performed by any other suitable devices. As one example, FIG. 9 illustrates an alternative embodiment of the plug link device 300 that includes a repeating device 332 that may allow the PLC signal to be communicated over longer distances without losing its strength of signal, and further includes a signal coupling device 336 that may pass the PLC signal from a first plug link device electrical line 316 to a second plug link device electrical line 320.

In one embodiment, the repeating device 332 may include any suitable repeater for receiving a PLC signal and re-transmitting the PLC signal at a higher power. Accordingly, the PLC signal that is re-transmitted by the repeating device 332 may travel a longer distance. According to the illustrated embodiment, the repeating device 332 may be coupled to the first plug link device electrical line 316. In such an embodiment, the repeating device 332 may re-transmit PLC signals that will be passed from the first plug link device electrical line 316 to the second plug link device electrical line 320, and may further re-transmit PLC signals that have already been passed to the first plug link device electrical line 316 from the second plug link device electrical line 320. In a further embodiment, the repeating device 332 may be coupled to the second plug link device electrical line 320. In such an embodiment, the repeating device 332 may re-transmit PLC signals that will be passed from the second plug link device electrical line 320 to the first plug link device electrical line 316, and may further re-transmit PLC signals that have already been passed to the second plug link device electrical line 320 from the first plug link device electrical line 316.

In one embodiment, the signal coupling device 336 may include any device that couples the first plug link device electrical line 316 to the second plug link device electrical line 320, and further allows a PLC signal to pass from the first plug link device electrical line 316 to the second plug link device electrical line 320. For example, the signal coupling device 336 may include a capacitor. As another example, the signal coupling device 336 may include a band-pass filter. As such, the signal coupling device 336 may include one or more resistors, one or more capacitors, and one or more inductors. In one embodiment, the signal coupling device 336 may allow the PLC signals to pass from the first plug link device electrical line 316 to the second plug link device electrical line 320, but may also prevent any electrical current from passing from the first plug link device electrical line 316 to the second plug link device electrical line 320. For example, the signal coupling device 336 may filter out an electrical current received from the first plug link device electrical line 316 so that none of the electrical current is passed to the second plug link device electrical line 320. As such, the signal coupling device 336 may prevent any short circuit of the first plug link device electrical line 316 and/or the second plug link device electrical line 320.

Figure 5:
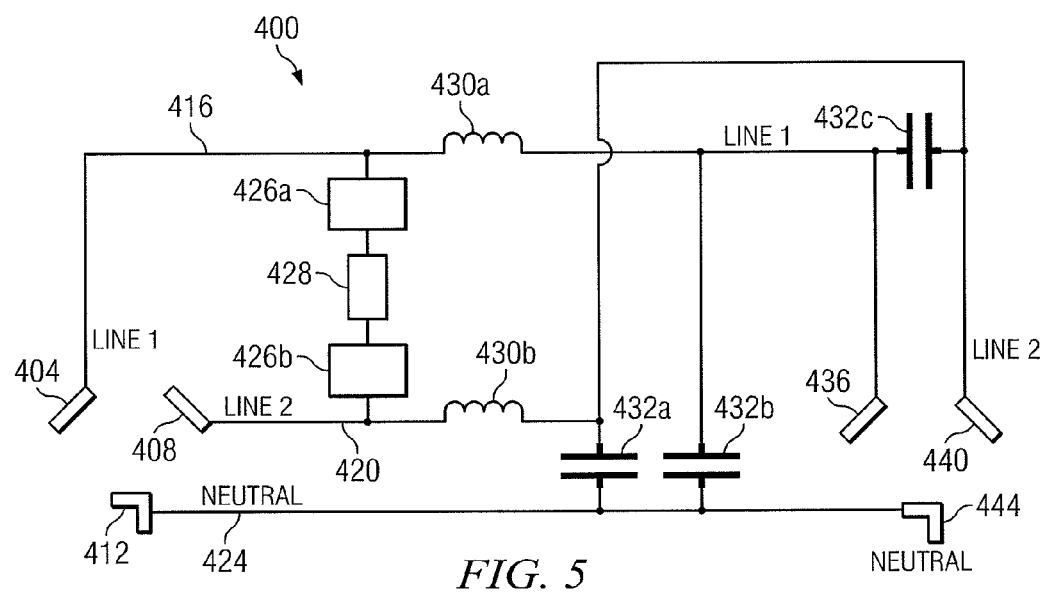
FIG. 5 is a diagram illustrating one embodiment of a plug link device for passing PLC signals from a first plug link device electrical line to a second plug link device electrical line, and further for providing electrical current to another device coupled to the plug link device.

FIG. 5 is a diagram illustrating one embodiment of a plug link device 400 for passing PLC signals from a first plug link device electrical line to a second plug link device electrical line, and further for providing electrical current to another device coupled to the plug link device 400. In one embodiment, the plug link device 400 may include a first electrical socket hole 436 and a second electrical socket hole 440 that may provide an electrical current to a device that is coupled the plug link device 400 through the first electrical socket hole 436 and the second electrical socket hole 440 As such, a device, such as a dryer unit or an oven, may be coupled to the plug link device 400 in order to receive an electrical current. Accordingly, the plug link device 400 may provide an electrical current to another device while the plug link device 400 also passes PLC signals from the first plug link device electrical line 416 to the second plug link device electrical line 420. In another embodiment, the plug link device 400 may further include PLC interfaces 426a and 426b that transform each received PLC signal from a first format into a second format before passing the PLC signal along. Accordingly, such transformation of the PLC signal may allow the PLC signal to be communicated over longer distances without losing its strength of signal.

According to the illustrated embodiment, the plug link device 400 may include a first plug link device prong 404, a second plug link device prong 408, a third plug link device prong 412, the first plug link device electrical line 416, the second plug link device electrical line 420, a ground wire 424, the PLC interfaces 426a and 426b, a coupling device 428, filters 430a and 430b, the standard capacitors 432a, 432b and 432c, a first electrical socket hole 436, a second electrical socket hole 440, and a third electrical socket hold 444. In one embodiment, the first plug link device prong 404 of FIG. 5 may be similar to the first plug link device prong 304 of FIG. 4; the second plug link device prong 408 of FIG. 5 may be similar to the second plug link device prong 308 of FIG. 4; the third plug link device prong 412 of FIG. 5 may be similar to the third plug link device prong 312 of FIG. 4; the first plug link device electrical line 416 of FIG. 5 may be similar to the first plug link device electrical line 316 of FIG. 4; the second plug link device electrical line 420 of FIG. 5 may be similar to the second plug link device electrical line 320 of FIG. 4; the ground wire 424 of FIG. 5 may be similar to the ground wire 324 of FIG. 4; the PLC interfaces 426a and 426b of FIG. 5 may be similar to the PLC interfaces 326a and 326b of FIG. 4; the coupling device 428 of FIG. 5 may be similar to the coupling device 328 of FIG. 4; the filters 430a and 430b of FIG. 5 may be similar to the filters 230a and 230b of FIG. 3; the standard capacitors 432a, 432b, and 432c of FIG. 5 may be similar to the standard capacitors 232a, 232b, and 232c of FIG. 3; the first electrical socket hole 436 of FIG. 5 may be similar to the first electrical socket hole 236 of FIG. 3; the second electrical socket hole 440 of FIG. 5 may be similar to the second electrical socket hole 240 of FIG. 3; and the third electrical socket hole 444 of FIG. 5 may be similar to the third electrical socket hole 244 of FIG. 3.

In one embodiment, the first electrical socket hole 436 and the second electrical socket hole 440 may each provide an electrical current to a device, such as an oven or a dryer, coupled to the plug link device 400 through the first electrical socket hole 436 and the second electrical socket hole 440, as is discussed above in FIG. 3. As such, in one embodiment, the plug link device 400 may provide an electrical current to another device while also passing PLC signals from the first plug link device electrical line 416 to the second plug link device electrical line 420.

Although the illustrated embodiment of the plug link device 400 illustrates PLC signals being passed from the first plug link device electrical line 416 to the second plug link device electrical line 420, the PLC signals may travel in any suitable direction. For example, the PLC signals may be passed from the second plug link device electrical line 420 to the first plug link device electrical line 416.

Modifications, additions, or omissions may be made to the plug link device 400 without departing from the scope of the invention. The components of the plug link device 400 may be integrated or separated. Moreover, the operations of the plug link device 400 may be performed by more, fewer, or other components. For example, the operations of the PLC interface 426a may be performed by more than one component.

Figure 10:
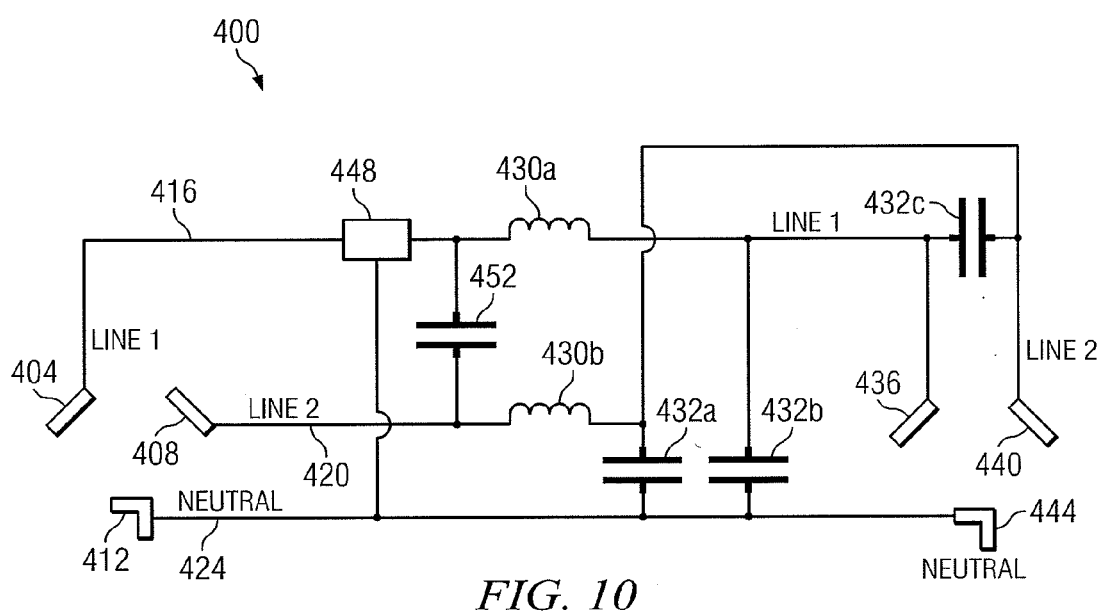
FIG. 10 is a diagram illustrating one embodiment of a plug link device for passing PLC signals from a first plug link device electrical line to a second plug link device electrical line, and further for providing electrical current to another device coupled to the plug link device.

In a further embodiment, the operations of the PLC interfaces 426 and the coupling device 428 of FIG. 5 may be performed by any other suitable devices. As one example, FIG. 10 illustrates an alternative embodiment of the plug link device 400 that includes a repeating device 448 that may allow the PLC signal to be communicated over longer distances without losing its strength of signal, and further includes a signal coupling device 452 that may pass the PLC signal from a first plug link device electrical line 416 to a second plug link device electrical line 420.

In one embodiment, the repeating device 448 may include any suitable repeater for receiving a PLC signal and re-transmitting the PLC signal at a higher power. Accordingly, the PLC signal that is re-transmitted by the repeating device 448 may travel a longer distance. According to the illustrated embodiment, the repeating device 448 may be coupled to the first plug link device electrical line 416. In such an embodiment, the repeating device 448 may re-transmit PLC signals that will be passed from the first plug link device electrical line 416 to the second plug link device electrical line 420, and may further re-transmit PLC signals that have already been passed to the first plug link device electrical line 416 from the second plug link device electrical line 420. In a further embodiment, the repeating device 448 may be coupled to the second plug link device electrical line 420. In such an embodiment, the repeating device 448 may re-transmit PLC signals that will be passed from the second plug link device electrical line 420 to the first plug link device electrical line 416, and may further re-transmit PLC signals that have already been passed to the second plug link device electrical line 420 from the first plug link device electrical line 416.

In one embodiment, the signal coupling device 452 may include any device that couples the first plug link device electrical line 416 to the second plug link device electrical line 420, and further allows a PLC signal to pass from the first plug link device electrical line 416 to the second plug link device electrical line 420. For example, the signal coupling device 452 may include a capacitor. As another example, the signal coupling device 452 may include a band-pass filter. In such an example, the signal coupling device 452 may include one or more resistors, one or more capacitors, and one or more inductors. In one embodiment, the signal coupling device 452 may allow the PLC signals to pass from the first plug link device electrical line 416 to the second plug link device electrical line 420, but may also prevent any electrical current from passing from the first plug link device electrical line 416 to the second plug link device electrical line 420. For example, the signal coupling device 452 may filter out an electrical current received from the first plug link device electrical line 416 so that none of the electrical current is passed to the second plug link device electrical line 420. As such, the signal coupling device 452 may prevent any short circuit of the first plug link device electrical line 416 and/or the second plug link device electrical line 420.

Figure 6:
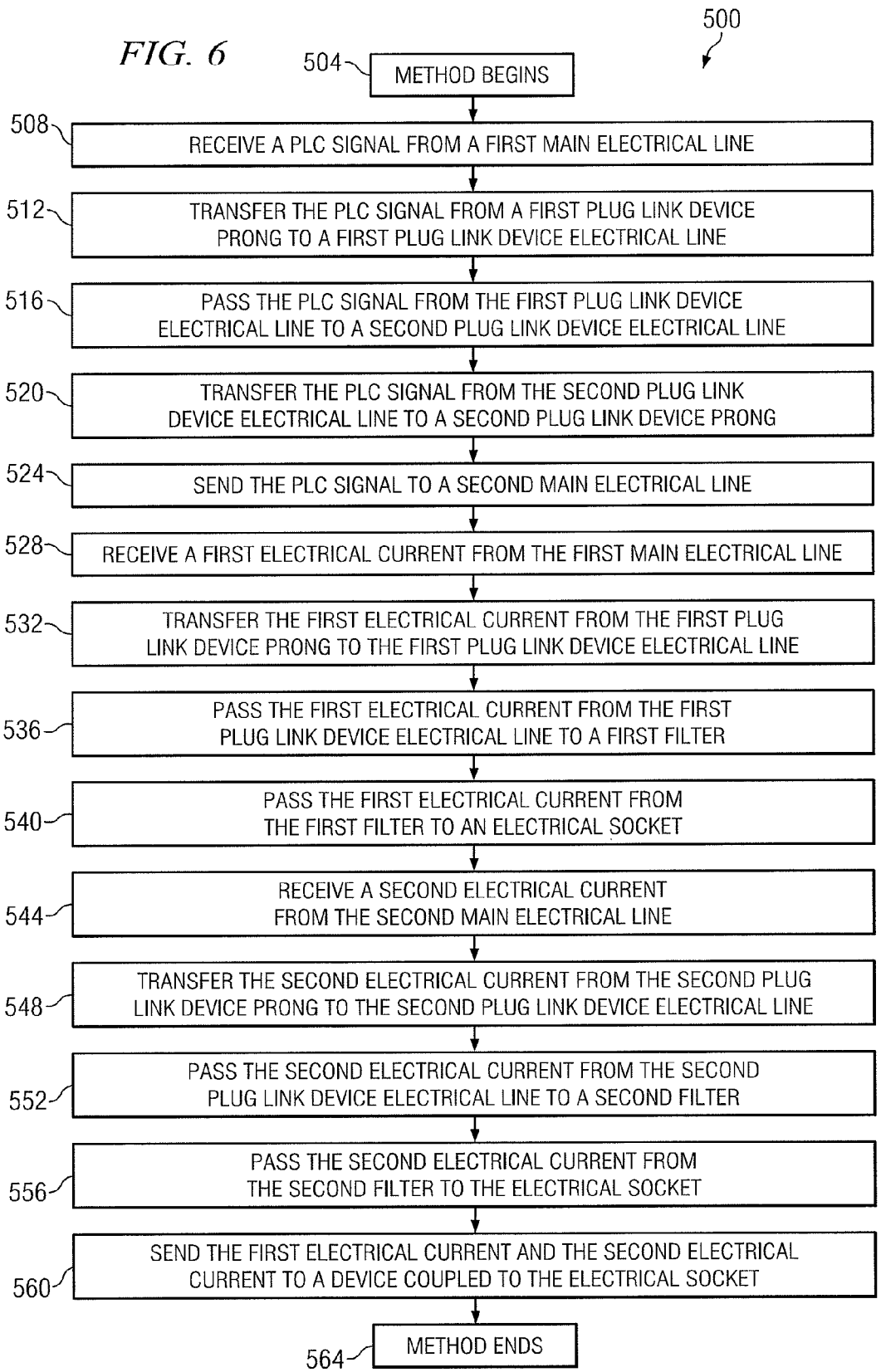
FIG. 6 illustrates a method for passing a PLC signal from a device coupled to a first main electrical line to a device coupled to a second main electrical line.

FIG. 6 illustrates a method 500 for passing a PLC signal from a device coupled to a first main electrical line to a device coupled to a second main electrical line. The method begins at step 504. At step 508, a PLC signal is received from a first main electrical line. In one embodiment, the PLC signal includes any communication signal that may travel over power lines. In one embodiment, the PLC signal may travel over electrical lines that provide an electrical current. According to one embodiment, the PLC signal is a communication signal sent from a device coupled to the first main electrical line. In another embodiment, the PLC signal is received at a plug link device that may pass the signal from the first main electrical line to a second main electrical line. In a further embodiment, the PLC signal is received at a first plug link device prong.

At step 512, the PLC signal is transferred from a first plug link device prong to a first plug link device electrical line. In one embodiment, the first plug link device prong may include any element that may couple the plug link device to the first main electrical line. In another embodiment, the first plug link device prong may couple the plug link device to the first main electrical line when the first plug link device prong is inserted into a combining outlet.

At step 516, the PLC signal is passed from the first plug link device electrical line to a second plug link device electrical line. In one embodiment, passing the PLC signal from the first plug link device electrical line to the second plug link device electrical line may include passing the PLC signal from the first plug link device electrical line to a coupling device that couples the first plug link device electrical line to the second plug link device electrical line, and passing the PLC signal from the coupling device to the second plug link device electrical line. In one embodiment, the coupling device may include a capacitor or a band-pass filter. In a further embodiment, the coupling device may pass PLC signals from the first plug link device electrical line to the second plug link device electrical line, but may prevent any electrical current from passing from the first plug link device electrical line to the second plug link device electrical line. In such an embodiment, the coupling device may prevent a short circuit from occurring in the first plug link device electrical line and/or the second plug link device electrical line.

In another embodiment, passing the PLC signal from the first plug link device electrical line to the second plug link device electrical line may include passing the PLC signal from the first plug link device electrical line to a first PLC interface, passing the PLC signal from the first PLC interface to a coupling device, passing the PLC signal from the coupling device to a second PLC interface, and passing the PLC signal from the second PLC interface to the second plug link device electrical line. In one embodiment, the PLC interfaces may each include any device that may transform the PLC signal from a first format to a second format. For example, the PLC interface may receive a PLC signal in an OFDM format and transform the PLC signal in an OFDM format to layer 2 frame format. In another embodiment, the PLC interface may receive the PLC signal in the layer 2 frame format and transform the PLC signal in the layer 2 frame format to an OFDM format.

In another embodiment, the coupling device may include an Ethernet bridge or an Ethernet switch. In such an embodiment, the Ethernet bridge or the Ethernet switch may receive the PLC signal in a particular format, such as layer 2 frame format, and pass the PLC signal in the layer 2 frame format to the second PLC interface. In such an embodiment, the second PLC interface may transform the PLC signal in the layer 2 frame format to the OFDM format. As such, in one embodiment, passing the PLC signal from the first plug link device electrical line to the second plug link device electrical line may result in the PLC signal having a stronger signal. Accordingly, the PLC signal may travel over longer distances.

At step 520, the PLC signal is transferred from the second plug link device electrical line to a second plug link device prong. At step 524, the PLC signal is sent to a second main electrical line. In one embodiment, the PLC signal may be sent to the second main electrical line through the second plug link device prong coupled to the second main electrical line. In one embodiment, by sending the PLC signal to the second main electrical line, the PLC signal that was originally passing through the first main electrical line is passed over to the second main electrical line. In one embodiment, this may allow the PLC signal to be communicated to a second device coupled to the second main electrical line.

At step 528, a first electrical current is received from the first main electrical line. In one embodiment, the first electrical current is received at the first plug link device prong. In one embodiment, the first electrical current may have any suitable voltage. For example, the first electrical current may be a 120 volt electrical current.

At step 532, the first electrical current is transferred from the first plug link device prong to the first plug link device electrical line. In one embodiment, after the first electrical current is transferred to the first plug link device electrical line, the first electrical current may be filtered, resulting in the first electrical current not being passed to the second plug link device electrical line. In one embodiment, the first electrical current may be filtered by a coupling device, such as a capacitor. In one embodiment, the filtering of the electrical current may occur at substantially the same time (or even the same time) as step 516, where the PLC signal is passed from the first plug link device electrical line to the second plug link device electrical line.

At step 536, the first electrical current is passed from the first plug link device electrical line to a first filter. In one embodiment, the first filter may include an inductor. In a further embodiment, the first filter may filter out any electrical noise received from another device coupled to the plug link device, such as a dryer unit or oven.

At step 540, the first electrical current is passed from the first filter to an electrical socket. In one embodiment, the first electrical current may be passed to a first electrical socket hole of the electrical socket.

At step 544, a second electrical current is received from the second main electrical line. In one embodiment, the second electrical current is received at the second plug link device prong. In one embodiment, the second electrical current may have any suitable voltage. For example, the second electrical current may be a 120 volt electrical current.

At step 548, the second electrical current is transferred from the second plug link device prong to the second plug link device electrical line. In one embodiment, after the second electrical current is transferred to the second plug link device electrical line, the second electrical current may be filtered, resulting in the second electrical current not being passed to the first plug link device electrical line. In one embodiment, the second electrical current may be filtered by a coupling device, such as a capacitor.

At step 552, the second electrical current is passed from the second plug link device electrical line to a second filter. In one embodiment, the second filter may include an inductor. In a further embodiment, the second filter may filter out any electrical noise received from another device coupled to the plug link device, such as a dryer unit or oven.

At step 556, the second electrical current is passed from the second filter to the electrical socket. In one embodiment, the second electrical current may be passed to a second electrical socket hole of the electrical socket.

At step 560, the first electrical current and the second electrical current are sent to a device coupled to the electrical socket. In one embodiment, sending the first electrical current and the second electrical current may result in the device receiving a 240 volt electrical current. According to one embodiment, the device coupled to the electrical socket may include any suitable device, such as a dryer or an oven. The method ends at step 564.

The steps illustrated in FIG. 6 may be combined, modified, or deleted where appropriate. For example, step 516 may be performed by other components, such as a repeating device and a signal coupling device. Additional steps may also be added to the example operation. For example, in certain embodiments, a coupling device may be used to test the first plug link device electrical line, the second plug link device electrical line, or any components coupled to either of the plug link device electrical lines. Furthermore, the described steps may be performed in any suitable order. Additionally, one or more of the steps may be performed at substantially the same time (or even the same time) as other steps illustrated.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed is:

1. A plug link device, comprising:
   a first prong;
   a first electrical line coupled to the first prong;
   a second prong;
   a second electrical line coupled to the second prong; and
   a first PLC interface coupled to the first electrical line, the first PLC interface configured to:
      receive, from the first electrical line, a PLC signal in an Orthogonal Frequency Division Multiplexing (OFDM) format; and
      transform the PLC signal into a layer 2 frame format;
   a capacitor coupled to the first PLC interface, the capacitor operable to receive the PLC signal in the layer 2 frame format; and
   a second PLC interface coupled to the capacitor and the second electrical line, the second PLC interface operable to receive the PLC signal in the layer 2 frame format from the capacitor and return the PLC signal to the OFDM format before transmitting the PLC signal to the second electrical line, and
   wherein transforming the PLC signal from the OFDM format to the layer 2 frame format or communication by the capacitor strengthens the PLC signal such that the PLC signal that is received from the second PLC interface at the second electrical line is stronger than the PLC signal that is received by the first PLC interface from the first electrical line.

2. The plug link device of claim 1, wherein the capacitor is further operable to:
receive an electrical current from the first electrical line; and
operate within a capacitance range selected to filter out the electrical current so that the electrical current is not passed to the second electrical line with the PLC signal.

3. The plug link device of claim 1, further comprising:
an electrical socket including a first electrical socket hole and a second electrical socket hole, wherein the first electrical socket hole is coupled to the first electrical line and the second electrical socket hole is coupled to the second electrical line;
a first inductor coupled to the first electrical line, wherein the first inductor is coupled to the first electrical line in a location in-between the first electrical socket hole and the capacitor; and
a second inductor coupled to the second electrical line, wherein the second inductor is coupled to the second electrical line in a location in-between the second electrical socket hole and the capacitor.

4. The plug link device of claim 1, wherein
the first prong and the second prong are operable to be inserted into a 240 volt electrical socket, wherein the first prong is operable to receive a first 120 volt electrical current, and wherein the second prong is operable to receive a second 120 volt electrical current.

5. The plug link device of claim 1, wherein the capacitor has a capacitance in the range of 0.0022-2.2 microfarads.

6. The plug link device of claim 3, wherein the first and second inductors each have an inductance in the range of 1.0 micro-henry-1.0 milli-henry.

7. A plug link device, comprising:
a first prong;
a first electrical line coupled to the first prong;
a second prong;
a second electrical line coupled to the second prong; and
a first Powerline Communication (PLC) interface coupled to the first electrical line;
a second PLC interface coupled to the second electrical line; and
a coupling device coupled to both the first electrical line and the second electrical line, wherein the coupling device is coupled to first electrical line and the second electrical line in-between the first PLC interface and the second PLC interface, and wherein the coupling device couples the first electrical line to the second electrical line, and
wherein the first PLC interface is operable to:
receive a PLC signal in a first format from the first electrical line;
transform the PLC signal from the first format to a second format; and
send the PLC signal in the second format to the coupling device; and
wherein the second PLC interface is operable to:
receive the PLC signal in the second format from the coupling device;
transform the PLC signal from the second format to the first format; and
send the PLC signal in the first format to the second electrical line; and
wherein transforming the PLC signal from the first format to the second format for communication by the coupling device strengthens the PLC signal such that the PLC signal that is sent by the second PLC interface to the second electrical line is stronger than the PLC signal that is received by the first PLC interface from the first electrical line.

8. The plug link device of claim 7, wherein the first format is Orthogonal Frequency Division Multiplexing (OFDM).

9. The plug link device of claim 7, wherein the coupling device is an Ethernet bridge operable to
receive a PLC signal from the first PLC interface; and
send the PLC signal to the second PLC interface.

10. The plug link device of claim 7, wherein the coupling device is a testing module operable to send a test signal to the first PLC interface.

11. The plug link device of claim 7, further comprising:
an electrical socket including a first electrical socket hole and a second electrical socket hole, wherein the first electrical socket hole is coupled to the first electrical line and the second electrical socket hole is coupled to the second electrical line;
a first inductor coupled to the first electrical line, wherein the first inductor is coupled to the first electrical line in a location in-between the first electrical socket hole and the first PLC interface; and
a second inductor coupled to the second electrical line, wherein the second inductor is coupled to the second electrical line in a location in-between the second electrical socket hole and the second PLC interface.

12. The plug link device of claim 7, wherein
the first prong and the second prong are operable to be inserted into a 240 volt electrical socket, wherein the first prong is operable to receive a first 120 volt electrical current, and wherein the second prong is operable to receive a second 120 volt electrical current.

13. A method, comprising:
receiving, at a first plug link device prong, a Powerline Communication (PLC) signal from a first main electrical line;
transferring the PLC signal from the first plug link device prong to a first plug link device electrical line;
passing the PLC signal in a first format from the first plug link device electrical line to a first PLC interface;
transforming, at the first PLC interface, the PLC signal from the first format to a second format;
passing the PLC signal in the second format from the first PLC interface to a coupling device;
passing the PLC signal in the second format from the coupling device to a second PLC interface;
transforming, at the second PLC interface, the PLC signal from the second format to the first format;
passing the PLC signal in the first format from the second PLC interface to the second plug link device electrical line;
transferring the PLC signal from the second plug link device electrical line to a second plug link device prong; and
sending, from the second plug link device prong, the PLC signal to a second main electrical line, and
wherein transforming the PLC signal from the first format to the second format for communication by the coupling device strengthens the PLC signal such that the PLC signal that is sent by the second PLC interface to the second electrical line is stronger than the PLC signal that is received by the first PLC interface from the first electrical line.

14. The method of claim 13, wherein the passing the PLC signal from the first plug link device electrical line to the second plug link device electrical line comprises:
 passing the PLC signal from the first plug link device electrical line to a capacitor, the capacitor coupling the first plug link device electrical line to the second plug link device electrical line; and
 passing the PLC signal from the capacitor to the second plug link device electrical line.

15. The method of claim 14, further comprising:
 receiving, at the capacitor, an electrical current from the first plug link device electrical line; and
 operating the capacitor within a capacitance range selected to filter out the electrical current so that the electrical current is not passed to the second plug link device electrical line with the PLC signal.

16. The method of claim 13, wherein the passing the PLC signal from the first plug link device electrical line to the second plug link device electrical line comprises:
 passing the PLC signal from the first plug link device electrical line to a first PLC interface;
 passing the PLC signal from the first PLC interface to a plug link device;
 passing the PLC signal from the plug link device to a second PLC interface; and
 passing the PLC signal from the second PLC interface to the second plug link device electrical line.

17. The method of claim 16, wherein the coupling device is selected from the group consisting of an Ethernet bridge and an Ethernet switch.

18. The method of claim 13, further comprising:
 receiving, at the first plug link device prong, a first electrical current from the first main electrical line;
 transferring the first electrical current from the first plug link device prong to the first plug link device electrical line;
 passing the first electrical current to a first inductor from the first plug link device electrical line;
 passing the first electrical current to an electrical socket from the first inductor;
 receiving, at the second plug link device prong, a second electrical current from the second main electrical line;
 transferring the second electrical current from the second plug link device prong to the second plug link device electrical line;
 passing the second electrical current to a second inductor from the second plug link device electrical line;
 passing the second electrical current to the electrical socket from the second inductor; and
 sending the first electrical current and the second electrical current to a device coupled to the electrical socket.

19. The method of claim 13, comprising:
 receiving, at the first plug link device prong, a first 120 volt electrical current from the first main electrical line;
 receiving, at the second plug link device prong, a second 120 volt electrical current from the second main electrical line, wherein the first plug link device prong is coupled to the first main electrical line through a 240 volt main electrical socket, and wherein the second plug link device prong is coupled to the second main electrical line through the 240 volt main electrical socket.

20. A system, comprising:
 a first main electrical line;
 a first device coupled to the first main electrical line;
 a second main electrical line;
 a second device coupled to the second main electrical line;
 a first plug link device prong coupled to the first main electrical line;
 a first plug link device electrical line coupled to the first plug link device prong;
 a second plug link device prong coupled to the second main electrical line;
 a second plug link device electrical line coupled to the second plug link device prong; and
 a first PLC interface coupled to the first plug link device electrical line, the first PLC interface operable to:
  receive a Powerline Communication (PLC) signal in a first format from the first plug link device electrical line; and
  transform the PLC signal from the first format to a second format;
 a coupling device coupled to the first PLC interface, the coupling device operable to receive the PLC signal in the second format from the first PLC interface;
 a second PLC interface coupled to the coupling device and the second plug link device electrical line, the second PLC interface operable to:
  receive the PLC signal in the second format from the coupling device;
  transform the PLC signal from the second format to the first format; and
  send the PLC signal in the first format to the second plug link device electrical line, and
 wherein the coupling device is coupled to the first plug link device electrical line and the second plug link device electrical line in-between the first PLC interface and the second PLC interface, and
 wherein transforming the PLC signal from the first format to the second format for communication by the coupling device strengthens the PLC signal such that the PLC signal that is sent by the second PLC interface to the second plug link device electrical line is stronger than the PLC signal that is received by the first PLC interface from the first plug link device electrical line.

21. The system of claim 20, wherein the coupling device is a capacitor.

22. The system of claim 20, wherein the coupling device is selected from the group consisting of an Ethernet bridge and an Ethernet switch.

23. The system of claim 20, wherein the second device is operable to receive the PLC signal sent from the first device.

24. The system of claim 20, further comprising:
 an electrical socket including a first electrical socket hole and a second electrical socket hole, wherein the first electrical socket hole is coupled to the first plug link device electrical line and the second electrical socket hole is coupled to the second plug link device electrical line;
 a first inductor coupled to the first plug link device electrical line, wherein the first inductor is coupled to the first plug link device electrical line in a location in-between the first electrical socket hole and the coupling device; and
 a second inductor coupled to the second plug link device electrical line, wherein the second inductor is coupled to the second plug link device electrical line in a location in-between the second electrical socket hole and the coupling device.

25. The plug link device of claim 8, wherein the second format is a layer 2 frame format.

26. The method of claim 13, wherein:
the first format comprises an Orthogonal Frequency Division Multiplexing (OFDM) format; and
the second format comprises a layer 2 frame format.

27. The system of claim 20, wherein:
the first format comprises an Orthogonal Frequency Division Multiplexing (OFDM) format; and
the second format comprises a layer 2 frame format.

* * * * *